(12) United States Patent
Fellner et al.

(10) Patent No.: US 10,947,046 B2
(45) Date of Patent: Mar. 16, 2021

(54) LOADING SYSTEM FOR PALLETING MIXED PRODUCTS ON A TARGET PALLET

(71) Applicants: Herbert Fellner, Kolbermoor (DE); Ludwig Brandmüller, Rosenheim (DE)

(72) Inventors: Herbert Fellner, Kolbermoor (DE); Ludwig Brandmüller, Rosenheim (DE)

(*) Notice: Subject to any disclaimer, the term of this patent is extended or adjusted under 35 U.S.C. 154(b) by 0 days.

(21) Appl. No.: 16/322,583

(22) PCT Filed: Aug. 9, 2017

(86) PCT No.: PCT/EP2017/070230
§ 371 (c)(1),
(2) Date: May 7, 2019

(87) PCT Pub. No.: WO2018/029268
PCT Pub. Date: Feb. 15, 2018

(65) Prior Publication Data
US 2019/0263591 A1 Aug. 29, 2019

(30) Foreign Application Priority Data

Aug. 9, 2016 (DE) .................... 10 2016 114 730.3
Aug. 23, 2016 (DE) .................... 10 2016 115 656.6

(51) Int. Cl.
*B65G 1/137* (2006.01)
*B65G 57/30* (2006.01)
(Continued)

(52) U.S. Cl.
CPC ......... *B65G 1/1378* (2013.01); *B65G 1/1373* (2013.01); *B65G 47/905* (2013.01);
(Continued)

(58) Field of Classification Search
CPC ...... B65G 1/1378; B65G 57/00; B65G 61/00; B65G 1/1373; B65G 47/905; B65G 57/302; B65G 2201/0267
(Continued)

(56) References Cited

U.S. PATENT DOCUMENTS 4,927,318 A 5/1990 Hayden
5,372,472 A * 12/1994 Winski .................. B65G 47/086
414/789.6
(Continued)

FOREIGN PATENT DOCUMENTS

DE 38 14 101 A1 11/1988
DE 102013003768 8/2014
(Continued)

OTHER PUBLICATIONS

International Preliminary Report on Patentability dated Feb. 12, 2019 in PCT/EP2017/070230.
(Continued)

*Primary Examiner* — Lynn E Schwenning
(74) *Attorney, Agent, or Firm* — Boyle Fredrickson S.C.

(57) ABSTRACT

Loading system for palletizing mixed products on a target pallet, having at least two infeed conveyors for the products to be palletized, at least one grab head which is configured to take at least one product from one of the infeed conveyors in a predetermined sequence and to stack it on a loading plate, via which at least one product stack can be transferred to the target pallet, wherein at least two, preferably more product stacks are arranged on the loading plate during stacking and which are arranged at a distance (a) from one another.

13 Claims, 8 Drawing Sheets

(51) Int. Cl.
 B65G 47/90 (2006.01)
 B65G 57/00 (2006.01)
 B65G 61/00 (2006.01)
(52) U.S. Cl.
 CPC ........... *B65G 57/00* (2013.01); *B65G 57/302* (2013.01); *B65G 61/00* (2013.01); *B65G 2201/0267* (2013.01)
(58) Field of Classification Search
 USPC .................................. 414/794.9, 799, 790.1
 See application file for complete search history.

(56) References Cited

U.S. PATENT DOCUMENTS

| | | | | |
|---|---|---|---|---|
| 5,738,484 | A | | 4/1998 | Taylor |
| 5,944,479 | A | * | 8/1999 | Kanaya ................. B65G 57/24 |
| | | | | 198/431 |
| 7,938,614 | B2 | * | 5/2011 | Fritzsche ............... B65G 57/06 |
| | | | | 414/622 |
| 8,074,431 | B1 | * | 12/2011 | Pierson ................ B65G 47/086 |
| | | | | 414/791.6 |
| 8,096,404 | B2 | * | 1/2012 | Eschlbeck ........... B65G 47/682 |
| | | | | 198/429 |
| 9,387,992 | B2 | * | 7/2016 | Boschi ................. B25J 15/0052 |
| 2005/0265816 | A1 | * | 12/2005 | Blanc .................... B65G 57/24 |
| | | | | 414/799 |
| 2007/0280814 | A1 | * | 12/2007 | Morency .............. B65G 1/1378 |
| | | | | 414/788 |
| 2008/0257684 | A1 | | 10/2008 | Weller |
| 2008/0267759 | A1 | * | 10/2008 | Morency .............. B65G 1/1378 |
| | | | | 414/788.8 |
| 2010/0146907 | A1 | * | 6/2010 | Fritzsche ................ B65B 35/52 |
| | | | | 53/147 |
| 2011/0076128 | A1 | * | 3/2011 | Johnsen ................. B65G 21/14 |
| | | | | 414/791.6 |
| 2018/0229948 | A1 | * | 8/2018 | Kollmuss ............... B65G 65/02 |

FOREIGN PATENT DOCUMENTS

| | | |
|---|---|---|
| EP | 0 511 529 A1 | 11/1992 |
| EP | 2 072 430 A1 | 6/2009 |
| EP | 2 330 060 A1 | 6/2011 |
| EP | 2 769 341 A2 | 8/2014 |
| EP | 2 794 439 | 4/2016 |
| JP | 2011251837 | 12/2011 |
| WO | 2011054053 A1 | 5/2011 |
| WO | 2012019591 | 2/2012 |

OTHER PUBLICATIONS

International Preliminary Report on Patentability dated Feb. 21, 2019 in PCT/EP2017/070236.
U.S. Appl. No. 16/322,589, filed May 24, 2019.

* cited by examiner

LOADING SYSTEM FOR PALLETING MIXED PRODUCTS ON A TARGET PALLET

BACKGROUND OF THE INVENTION

Field of the Invention

The invention relates to a loading system for palletizing different products on a target pallet and a grab head suitable for such a loading system.

Description of Related Art

In particular with large commercial chains and discounters, a high logistical effort is required to distribute the goods to their sales centers or sales branches. Usually, in large distribution centers with corresponding high-bay warehouses, the single-variety products are temporarily stored on so-called customer trays. These products are delivered by the manufacturer to the distribution center on manufacturer pallets in layers, sorted by type—for intermediate storage it is then necessary to depalletize the single-variety pallets in layers. Such depalletizing by hand is connected with an enormous personnel expenditure. To simplify matters, EP 2 794 439 B1 of the Applicant suggests an automated depalletizing system, in which a removal unit with friction-locking mechanism and a vacuum removal unit can be used alternatively or together to remove a product layer from a stack of single-variety products.

For delivery to the branches/sales centers, the intermediately stored single-variety products are then assembled on picking pallets for delivery to the branches/distribution centers. In contrast to the depalletizing described above, this picking is currently carried out almost exclusively by hand. Manual picking is very personnel-intensive due to labor law regulations—for example, the maximum total load to be lifted during a shift is limited by law to 3000 kg/person—and there are also extremely high requirements regarding packing quality and a high cost pressure.

The experience of the pickers plays a significant role in this manual picking process, since the individual products on the target pallet have to be positioned in such a way that the product stack is relatively stable on the one hand and the products are not damaged on the other hand. For example, when picking fruit, vegetables or the like, the trays used have stacking lugs that engage with corresponding recesses of the tray above or below the product stack to position them relative to each other. At present, these trays are stacked exclusively by hand.

A further problem with picking is that the products on the target pallet have to be positioned in a certain order so that, for example, the products can be placed on the shelves in a retail shop without having to drive back and forth. For this reason, discounters usually place their products within their salesrooms in a certain order that is also familiar to the customers, so that they can quickly find the respective product. Accordingly, the packages/products have to be positioned on the target pallet depending on this placement in the salesroom.

So far, this complex task can only be solved by an experienced picker. Machine solutions, as described in the following, are not suitable for this.

U.S. Pat. No. 8,074,431 B1 shows a loading system in which the products are fed via an infeed conveyor and are then deposited on a grid by means of a grab head. The products are arranged layer by layer on the grid and then transferred to a target pallet after the level/layer has been built up. In principle, such a solution also makes it possible to form a multi-layer product stack on the grid, which is then transferred in its entirety to the target pallet.

In the case where products with different dimensions and thus also with different stacking lug positions are present, such an automated solution cannot be used, since the layer-by-layer structure in the aforementioned order excludes a relative positioning of the stacking lugs to the stacking recesses for different product types.

US 2010/0146907 A1 discloses a loading system in which a separable loading plate is used instead of a grid, on which the products are placed layer by layer or level by level and then transferred to a target pallet. This loading system has the same disadvantages as the solution described above.

In JP 2011 251 837 A, a loading system with a fork head is shown—such a fork head is not suitable for picking tasks of the aforementioned kind.

In U.S. Pat. No. 2,008,267 759, a loading system is shown in which the products are stored level by level directly on a target pallet.

DE 10 2013 003 768 E1 shows a loading system with a fork head that can be equipped with a knife edge. Such a fork head—as described above for JP 2011 251 837 A—is not suitable to fulfill the picking tasks described at the beginning, but is preferably used for dry goods.

WO 2012/019 591 A2 shows a loading system in which a grab head gripping the periphery of a trading unit/product interacts with a stacking device which has an inclined base surface and a centering bar for stacking the picking goods.

Such a solution also does not allow more complex picking tasks to be performed.

SUMMARY OF THE INVENTION

Accordingly, the invention is based on the object of creating a loading system that simplifies the picking process.

This object is solved by a loading system with the features of the claims as well as by a grab head suitable for such a loading system.

Advantageous further developments of the invention are the subject matter of the dependent claims.

The loading system according to the invention is used for palletizing the articles/products to be picked—also called packages—on a target pallet. Accordingly, the loading system has at least two infeed conveyors/belts for the products to be palletized. These are taken from the infeed conveyors by means of a grab head according to a predetermined planning algorithm (packing pattern generator) and placed on a preferably separable loading plate. The products are stacked via the grab head to form towers (product stacks).

The loading plate is located in the immediate vicinity of the target pallet, so that the product stacks can be easily transferred from the loading plate to the target pallet. In a subsequent step, the picked target pallet, i.e. the target pallet loaded with the different products, can then be equipped with a suitable transport safety device and can be discharged.

By means of the loading system according to the invention with at least two infeed conveyors for the mixed products, with at least one grab head which is configured to take off the products from the infeed conveyors in a sequence according to a planning algorithm, and with a loading plate on which the products can be placed in a number of product stacks and which is configured to transfer the product stacks to the target pallet, the picking process can be carried out largely fully automatically without requiring manual intervention.

For example, the product stacks can be formed in such a way that individual trays with the stacking lugs/stacking recesses described above are stacked in these stacks, whereby the stacking sequence in the individual product stacks can be individually adapted to the respective picking task. Only when the individual product stacks have been brought to the predetermined height, for example 2 m, are they preferably pushed together via a centering device and transferred to the target pallet.

This procedure differs fundamentally from the well-known automated picking methods described at the beginning, where a single product layer is positioned on the grid or loading plate and is then transferred layer by layer to the target pallet.

Accordingly, picking can be carried out faster than with conventional solutions with considerably reduced personnel requirements. With the system according to the invention, picking can be carried out, for example, with 500 cycles per hour.

In an embodiment of the invention, the area provided by the loading plate is larger than the area of the target pallet—in this way it is possible to stack the product stacks at a certain distance from each other on the loading plate.

According to the invention, it is preferred to build the product stack level by level. The product stacks thus "grow" roughly in parallel. One level of a product stack can have several products/packages, which are removed from the infeed conveyor by the grab head in an operation and are placed on the loading plate.

In principle, it can also be provided to store several smaller packages on a buffer station and then to push them together, so that the size of these packages corresponds to the base surface of a larger product. The packages which were pushed together are then moved from the buffer station to the product tower using the grab head.

In a particularly preferred embodiment, the loading system is designed with a centering device for pushing the product stacks together. The product stacks, which are preferably spaced apart during stacking, are compacted with this centering device so that the transfer to the target pallet is simplified.

Such a centering device can, for example, have five sliding panels that can be moved and/or pivoted to push the product stacks together and to discharge the loaded target pallet.

The transfer of the product stacks to the target pallet is particularly easy if the loading plate can be moved away or separated horizontally under the product stacks for transfer. It is preferred if these product stacks are fixed in position during transfer by a suitable device, preferably by the aforementioned centering device.

The grab head in an embodiment of the loading system according to the invention is similar to the prior art according to WO 2012/019 591 A2 with at least four grabber plates arranged at right angles to each other, which can be brought into lateral contact with the product(s) or a product stack for gripping them.

The grab head is preferably slidable in X, Y and/or Z direction and is configured with a rotation axis C, so that a grab head can be assigned to several infeed conveyors.

In a preferred embodiment of the invention, four infeed conveyors are provided, to which two independently drivable grab heads are assigned.

The support of the products during removal from the infeed conveyor and depositing on the loading plate is improved if a slidable device for supporting the product or product stack is assigned to the grabber plates.

In a particularly preferred embodiment of the invention, this device is configured in such a way that, when lowering the grab head, it centers the already present product stack with regard to the product to be placed on it. This ensures that the product stack can be built to fit accurately. Stacking lugs provided for some products then dive into a corresponding stacking recess of the adjacent product in the product stack—such relative positioning is automatically made possible by the solution according to the invention.

In an embodiment of the invention, this device is formed by centering bars, whereby such a centering bar is provided in the area of each grabber plate. In a centering position, these centering bars preferably protrude as a centering frame which opens approximately conically in the direction of the product stack, whereby this centering frame initially has a larger clear width than the base surface of the product, so that when the grab head is lowered, the centering frame runs onto the product stack already deposited and aligns it in the direction of the product held in the grab head.

In principle, the relative position of the product stack with reference to the grab head can also be detected via suitable sensors, so that centering is then performed by appropriate driving of the grab head.

The centering bars can then be moved to a support position to support the product.

In a variant of the grab head, these centering bars are then guided in a corresponding motion link of a grabber arm, along which the centering bars are slidable from their centering position into the support position and vice versa.

The method can be performed, for example, by means of a suitable linear drive that moves the centering bar along the motion link, so that it performs a vertical and tilting stroke when it is moved from the centering position to the support position.

In the case where the products have a roughly rectangular base surface, such as vegetable trays, two adjacent grabber plates or a grabber plate with a larger cross-sectional area than those grabber plates which grip the shorter side surface of the tray may be designed on the long side.

The grabber plates can preferably be driven synchronously in pairs via a common drive.

In another embodiment of the grab head according to the invention, a sensor arrangement is provided in the area of the centering bar, by means of which the height of the product stack already deposited can be measured.

The centering bars of the centering frame can be configured such that they completely retract into the grabber arm on which the grabber plates are held. Accordingly, these centering bars are only operatively engaged with products that require pre-centering of the product stack in relation to the product (or vice versa).

The Applicants reserve the right to base a separate patent request on the grab head with the associated features.

In an alternative solution, the loading system is executed with a fork head, which places the products directly on a target pallet as specified by the packing pattern generator.

This fork head can be equipped with a "knife edge" as provided in EP 2 794 439 B1 mentioned above.

With this alternative, the position of the product layers placed on the target pallet is fixed using a suitable transport safety device. This can, for example, be a height-adjustable foil ring winder.

Even highly complex picking tasks can be handled with a loading system that is configured with both a grab head and a fork head, which are brought into engagement depending on the type of the products to be picked.

The algorithm for generating the picking commissions and for generating the packing pattern (packing pattern generator) is integrated into the control of the loading system.

The packing pattern generator can be used to create a virtual representation of the loaded target pallet before the picking is carried out, allowing a machine operator or a similar person to check the plausibility of the generated packing pattern. The progress of the picking process can also be monitored on the basis of this graphical representation.

Since these machine operators/pickers have a lot of experience, they can check the packing pattern for plausibility and intervene manually, if necessary, if this packing pattern does not meet the expectations. It is possible, for example, to adjust the packing pattern in the graphic display using a touch screen. The memory of the packing pattern generator is designed in such a way that these empirical values of the machine operators are stored and are then included in the generation of the respective packing pattern for the next similar picking commission.

In case the target pallet has dimensions or a structure so that it cannot be moved under the loading plate via the pallet transport belt, an alternative transport means is used, e.g. a transport cart equipped with a telescopic fork which picks up the target pallet/empty pallet and is moved under the loading plate for loading. Loading and discharge can then take place either from the supply side of the empty pallet or from the discharge side. The Applicants reserve the right to base a separate claim on the use of such an alternative pallet transport means.

BRIEF DESCRIPTION OF THE DRAWINGS

Preferred embodiments of the invention are explained in more detail below using schematic drawings. They show.

DETAILED DESCRIPTION OF THE PREFERRED EMBODIMENTS

Figure 1:
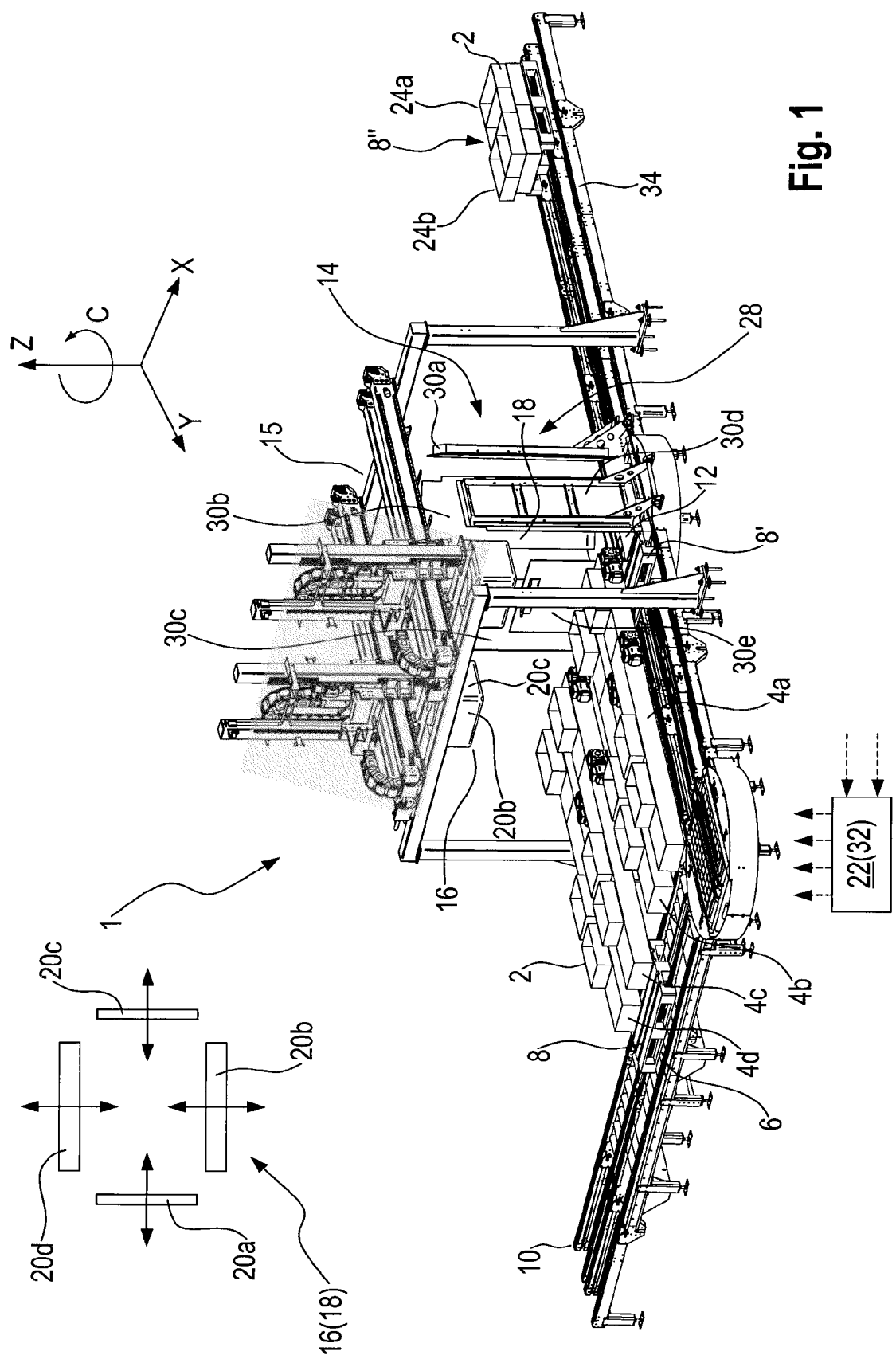
FIG. 1 shows a three-dimensional representation of an embodiment of a loading system according to the invention.
Figure 2:
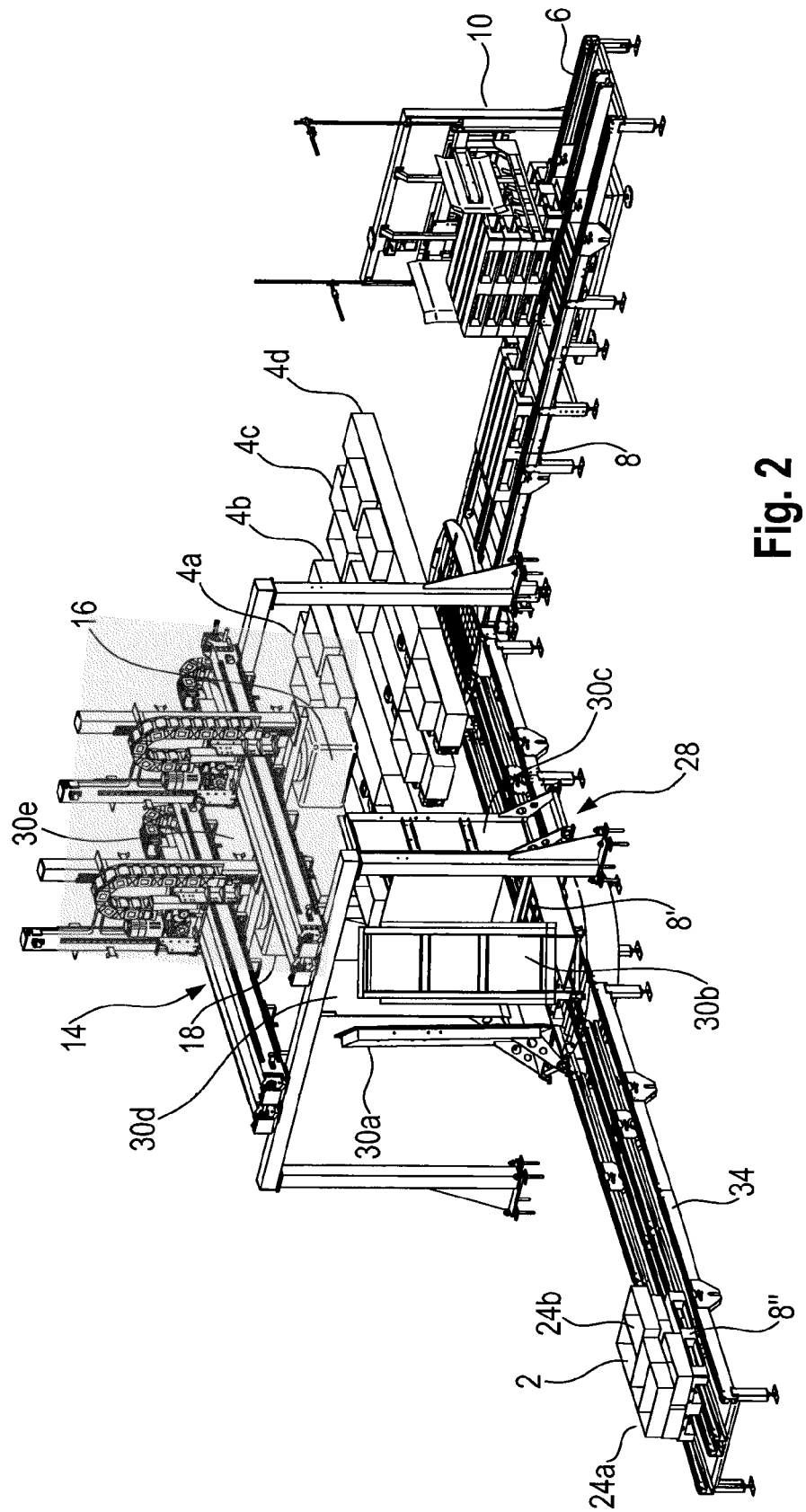
FIG. 2 shows a rear view of the loading system according to FIG. 1.
Figure 3:
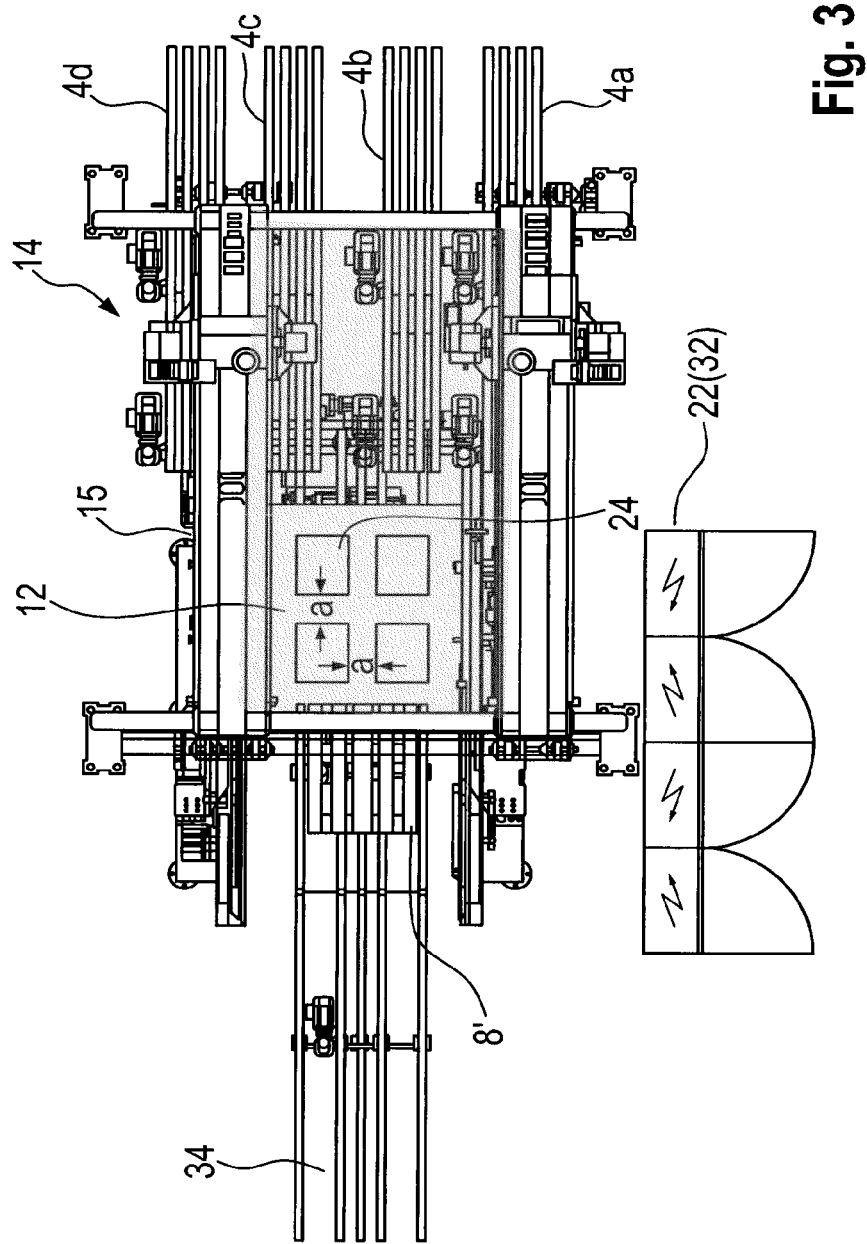
FIG. 3 shows a top view of the loading system according to FIG. 1.

According to FIGS. 1 to 3, the products to be picked 2 (packages), e.g. fruit and vegetable crates, by means of the loading system 1 according to the invention are provided from the intermediate storage described at the beginning to four infeed conveyors or belts 4*a*, 4*b*, 4*c* and 4*d*. In a level below the infeed conveyors 4, a pallet conveyor belt 6 is provided over which, according to FIG. 2, a target pallet 8, which is separated from a pallet magazine 10, is brought via a 90° deflection into a loading position, which is marked with the reference sign 8' in the representation according to FIG. 1.

In this loading position, the target pallet 8' is located below a separable loading plate 12, which is visible especially well in FIG. 3. In this drawing, the target pallet 8' is just moving into the position below the loading plate 12. As can be seen from this illustration, the base surface, i.e. the area of the loading plate 12 to be loaded, is significantly larger than the base surface of the pallet 8'. This loading plate 12 is—as will be explained in more detail below—slidable or separable in the horizontal direction within a picking unit 14. This unit has a gantry 15 on which two grab heads 16, 18 are arranged via an X, Y and/or Z guide which can be adjusted via linear drives. The grab heads 16, 18 can also be swiveled over a rotation axis C (see FIG. 1) to align them with the product 2.

Since two grab heads 16, 18 are used in parallel, they can reach the complete pallet construction space as well as all receiving positions of the infeed conveyors 4 independently of each other. In the case of construction space overlapping, one grab head 16, 18 is moved to the respective waiting position, so that the other grab head 16, 18 can reach the target position on the loading plate 12. In case of an error, at least one grab head 16, 18 with the assigned grab head gantry can continue palletizing at half the performance.

Due to the total of eight package-receiving positions distributed over four parallel infeed conveyors 4 as well as the optional buffer positions next to the gantry 15 with the two grab gantries and a commission pallet height of 2000 mm, for example, the loading system can be designed to be very compact with a high picking performance. The buffer positions can be accessed at ground level and without additional centering aids. These buffer positions are used to support the sequence-appropriate provision of packages for the construction of the commission pallet. As explained at the beginning, smaller packages, such as those with half or a quarter of the base surface of the products/packages described above, are first positioned at a distance from each other and then pushed together using the grab head, so that they have the area of a larger product in this compressed arrangement. This compressed layer of the smaller packages is then placed on the already built product stack using the grab head, so that correspondingly two or four smaller packages are placed on a larger product/tray.

In particular with fruit or vegetable trays, it is advantageous if the grabber also has a retainer plate that holds down the vegetable/fruit during the stacking process.

The grab gantries described above are provided with belt-driven linear axes so that a very good repeat accuracy in the range of +/−2 mm is guaranteed.

As indicated in FIG. 1 at the top left, in the shown embodiment each grab head 16, 18 has respectively four grabber plates 20*a*, 20*b*, 20*c*, 20*d*, which are arranged at right angles to each other and thus form a rectangle (at least in sections) in the plan view. Depending on the geometry of the products 2, the grabber plates 20 are slidable towards or away from each other in the direction of the arrow (see FIG. 1, top left) in order to be brought into lateral contact with the outer wall of product 2, for example a fruit/vegetable crate. This displacement movement takes place in such a way that a sufficient holding force can be applied by force or friction engagement to hold the product 2.

In the three-dimensional illustrations according to FIGS. 1 and 2, only two of the grabber plates are visible, for example, the grabber plates 20*b*, 20*c* of the grab head 16. The drives for adjusting the grabber plates 20 are not shown either. For further details, please refer to FIGS. 4 to 7 described below.

For driving the loading system 1, a control unit 22 with integrated packing pattern generator 32 is provided as shown in FIG. 3, in which a predetermined packing pattern is calculated according to the algorithm mentioned above for generating the picking commissions, according to which the products 2 are to be placed on the loading plate 12/target pallet 8. Depending on this packing pattern, the grab heads 16, 18 are then driven to pick up the products 2 in the predetermined sequence from the infeed conveyors 4*a*, 4*b*, 4*c* and 4*d* and to place them on the loading plate 12. The products 2, for example the fruit and vegetable crates, are stacked to form towers (product stacks). This stacking takes place in layers in such a way that the product stacks "grow" in parallel, so to speak. However, it is possible that a higher product or several products are stacked at the same time in a product stack, so that the product stack height of the plurality of product stacks can vary to a certain extent.

The individual product stacks on the loading plate 12 are initially spaced apart from each other to create space for the grabber plates 20 of the grab heads 16, 18 to move into the spaces between the product stacks. In this way, for example, one to eight, preferably four, product stacks/towers can be placed on the loading plate 12. These towers are marked with the reference sign 24 as shown in the illustration in FIG. 3. As mentioned, these towers 24 are spaced apart by the distance a to each other to make room for the insertion of the grab head 16, 18.

As explained above, a stroke of the grab head 16, 18 can also be used to remove several products as intermediate stacks from the infeed conveyors 4 and to place them on the loading plate 12.

As already explained, it is possible to temporarily store smaller products/packages in a buffer station, to push them together and then to place them on the respective tower 24 using the grab head.

The loading system is furthermore equipped with a centering device 28, which is visible particularly well in FIG. 2. This centering device 28 has five sliding panels 30*a*, 30*b*, 30*c*, 30*d* and 30*e*, which are arranged according to FIG. 1 along the outer circumference of the loading plate 12 and—similar to the grabber plates 20—are slidable towards each other in order to move the product stacks/towers 24 in such a way that the distances a close and the towers 24 lie against each other. This means that the towers 24 are compacted and centered via the sliding panels 30 in such a way that the base surface occupied by the towers 24 is equal to or smaller than the base surface of the target pallet 8'. After this centering process, the sliding panels 30 remain in contact with the towers 24, so that they are fixed in position relative to each other. The loading plate 12 is then moved or moved apart along a guide in the horizontal direction (in the drawing plane as shown in FIG. 3), whereby the towers 24 remain stationary and can then be placed on the target pallet 8' by moving the sliding panels 30 apart and, if necessary, a small vertical stroke (Z direction).

The sliding panels 30*a*, 30*b*, 30*c*, 30*d* and 30*e* are adjustable independently from each other, so that the towers 24 placed on the loading plate 12 are pushed together to form the pallet nominal size including an overhang of 25 mm, for example, before they are transferred to the target pallet 8 or any other loading aid. The sliding panels 30 are moved by asynchronous drives and a rack mechanism. The sliding panels 30*c*, 30*d*, 30*e* (see FIG. 2) are constructed as a unit, which are slidable by means of a common drive. The two sliding panels 30*a*, 30*b* shown in FIG. 2 in the front are pivotably mounted and driven so that they open the transport path in the shown position to discharge the completed commission pallet. This means that the sliding panel on the discharge side is configured in two parts and can be opened to allow the loaded target pallet 8" to be moved out. This pivoting is achieved by means of a joint arrangement and a rack mechanism. Accordingly, the centering device 28 shown has seven drive units (two pivoting drives, five linear drives) so that the towers 24 can be pushed together very quickly and with high precision.

The Patent Applicants also reserve the right to base a separate independent patent claim on the pivotable sliding panels.

The picked pallet 8" is then discharged via a discharge belt 34. The picked pallet 8" can be equipped with a suitable transport safety device, for example a belt or foil. This transport safety device can be attached within the picking unit 14 or in a subsequent station. In the illustration shown in FIGS. 1 and 2, the loaded target pallet (picked pallet 8") is only shown in a partially loaded state. As explained above, the total height of the discharged pallet 8" can be about 2 m.

In FIG. 3, four product stacks/towers 24 are provided—of course it is also possible to store a different number of towers on the loading plate 12.

Figure 4:
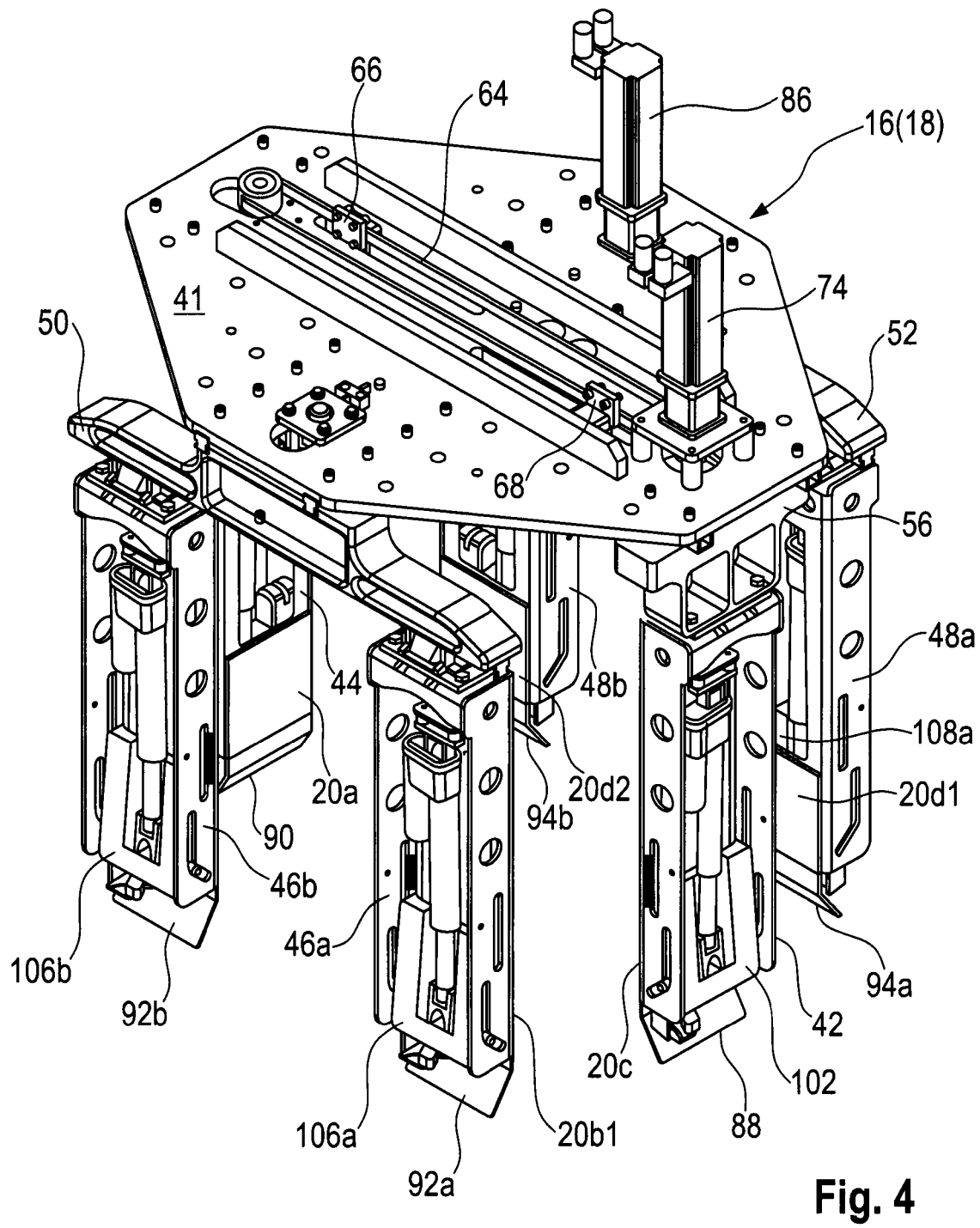
FIG. 4 shows a variant of a grab head for a loading system according to FIGS. 1 to 3.
Figure 5:
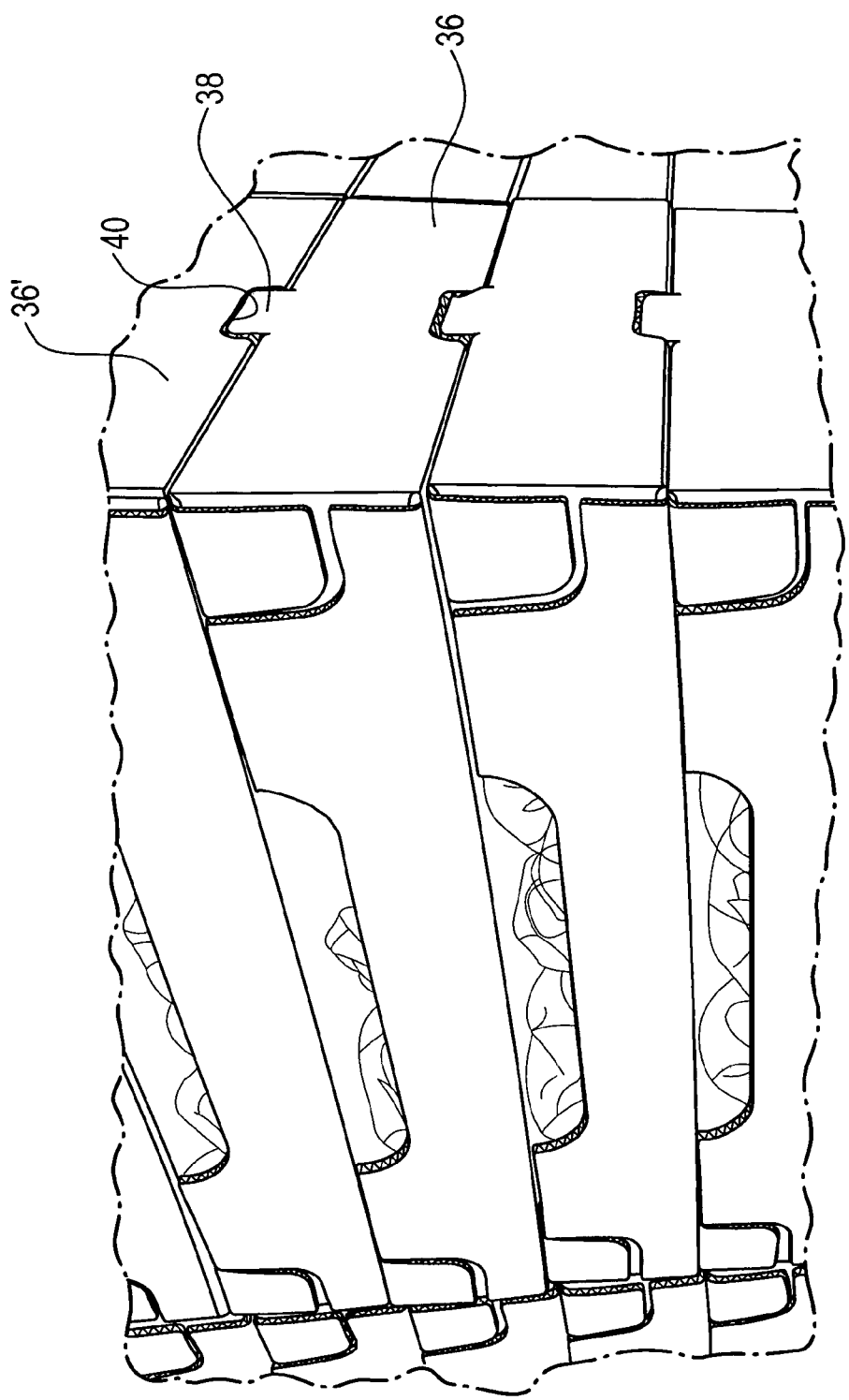
FIG. 5 shows trays of a product stack that is built using a grab head as shown in FIG. 4.

FIG. 4 shows a three-dimensional detail drawing of a grab head 16, 18 suitable for the loading system 1 according to the invention. This grab head 16 is suitable for stacking trays with a rectangular base. Such trays are used, for example, for fruit and vegetables. As shown in FIG. 5, such trays 36, for example, have a cantilevered stacking lug 38 in the area of their upper peripheral edge, which immerses into a stacking recess 40 of an adjacent tray 36' in a product stack. A corresponding centering arrangement with a stacking lug and a stacking recess is also provided on the opposite side surface (not visible in FIG. 5) of the trays 36, 36', so that these are positioned exactly relative to each other. Stacking therefore has to take place in such a way that the respective stacking lugs 38 are aligned with reference to the stacking recesses 40.

The grab head 16, 18 shown in FIGS. 1 and 2 has four grabber plates, whereby each side wall of product 2 and tray 36 is assigned a grabber plate.

FIG. 4 shows a variant that is particularly suitable for rectangular products/trays that have two longitudinal side surface and two shorter side surface. In such an embodiment, two grabber plates 20*b*1, 20*b*2 and 20*d*1, 20*d*2 are assigned to the longitudinal sides of the product 2 or the tray 36, respectively.

According to the illustration in FIG. 4, the grab head 16 has a holding/guide plate 41, on which the aforementioned grabber plates 20*a*, 20*b*, 20*c*, 20*d* are adjustably guided. These grabber plates are each held on a grabber arm 42, 44, 46*a*, 46*b* and 48*a*, 48*b*, whereby the grabber arms 42, 44 are each assigned to the shorter side surfaces of the product 2 and the grabber arms 46*a*, 46*b* and 48*a*, 48*b* arranged in pairs are assigned to the two longer side surfaces. The two grabber arms 46*a*, 46*b* and 48*a*, 48*b* arranged in pairs are each arranged on an approximately T-shaped double carriage 50, 52, which is adjustable along a guide described below, in order to adjust the support distance between the two double carriages 50, 52 or respectively the associated grabber arms 46*a*, 46*b* and 48*a*, 48*b*. The two individual grabber arms 42, 44 are each mounted on a single carriage 56, 58 (see especially FIG. 6) in a corresponding manner, which are also slidable along a guide in order to bring the grabber plates 20*a*, 20*c* into contact with the shorter side surfaces of the product 2/trays 36. These grabber arms 42, 44 can also be moved synchronously, whereby this movement path runs transversely to that of the double carriages 50, 52.

Figure 6:
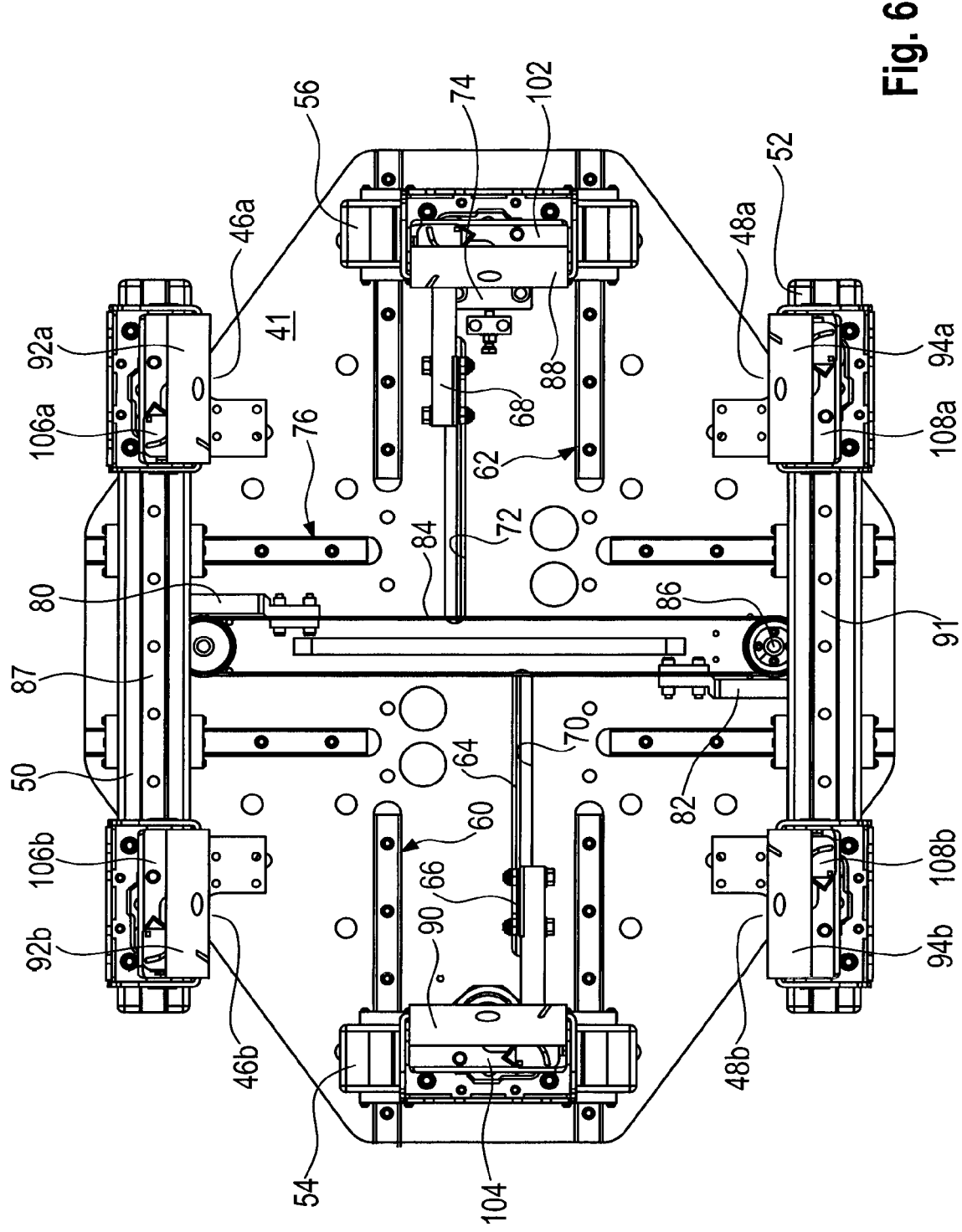
FIG. 6 shows a subview of the grab head according to FIG. 4.

According to the bottom view in FIG. 6, the two single carriages 56, 58 are each guided along a longitudinal guide 60, 62, which consists of two guide rails each, along which the two single carriages 56, 58 are slidable. Both single carriages 56, 58 are each connected to a tooth belt 64 visible in FIG. 4, whereby a respective connection bracket 66, 68 extends through a slit 70, 72 of the guide plate 41. The tooth belt is driven by a servo motor 74 (see FIG. 4), which is mounted on the guide plate 41.

The double carriages 50, 52 are guided accordingly. These are guided on a transverse guide 76, 78 running transversely to the longitudinal guide 60, which in turn consists of two respective guide rails arranged in parallel, on which sliding or roller bearing-guided guide units are mounted, which are connected to the double carriages 50, 52.

The two double carriages 50, 52 are each connected via catchers 80, 82 to another tooth belt 84, which is driven by another servo motor 86 (see FIG. 4) through the guide plate 41. The single carriages 56, 58 and the double carriages 50, 52 are attached to the tooth belts 64, 84 in such a way that the respectively assigned carriages move parallel towards or away from each other depending on the direction of rotation of the servo drive in order to adjust the distance to the dimensions of the product 2/tray 36.

The two grabber arms 46a, 46b and 48a, 48b, respectively held on a double carriage 50, 52 each are each guided on a guide rail 87, 91, so that their distance can be adjusted. This adjustment can also be carried out by an electric motor, so that simple adaptation to different product geometries is possible.

The construction of the grab head 16 shown here permits all specified packages (module and intermediate dimensions, weights, types of packaging) to be picked up, transported and delivered safely and in a controlled manner for all types.

The grab head 16, 18 is preferably designed as a sheet-welded construction. For package-specific gripping, the grabber arms 42, 44, 46a, 46b and 48a, 48b are driven by servo motors as described, whereby a force-dependent or torque-dependent control can be provided. With the help of the servo drive units including on-board controllers (CU) on the respective grab head 16, 18, weight savings are possible as compared to conventional servo drives.

In order to ensure safe transport of the packages, centering bars 88, 90, 92a, 92b, and 94a, 94b are attached to the grabber arms 42, 44, 46, 48, respectively, which fulfill a dual function. In the position shown in FIGS. 4, 6 and 7, the centering bars 88, 90, 92a, 92b, 94a, 94b serve for centering the already constructed tower 24/product stack with reference to the product/package/tray held at the grab head 16, 18. In a support position indicated by a dashed line in FIG. 7, the centering bars 88, 90, 92a, 92b and 94a, 94b enter in the direction towards the package, so that it is supported laterally by the grabber plates 20a, 20b, 20c, 20d and from below by the centering bars 88, 90, 92a, 92b and 94a, 94b.

With an arrangement according to FIG. 4, the grabber plates 20b, 20d in FIGS. 1 and 2 on the long sides are formed in two parts by a respective grabber plate 20b1, 20b2 and 20d1, 20d2. The grabber plates 20a, 20c assigned to the shorter side surfaces of the trays of the embodiment according to FIG. 4 correspond to the grabber plates 20a, 20c as shown in FIG. 1.

Figure 7:
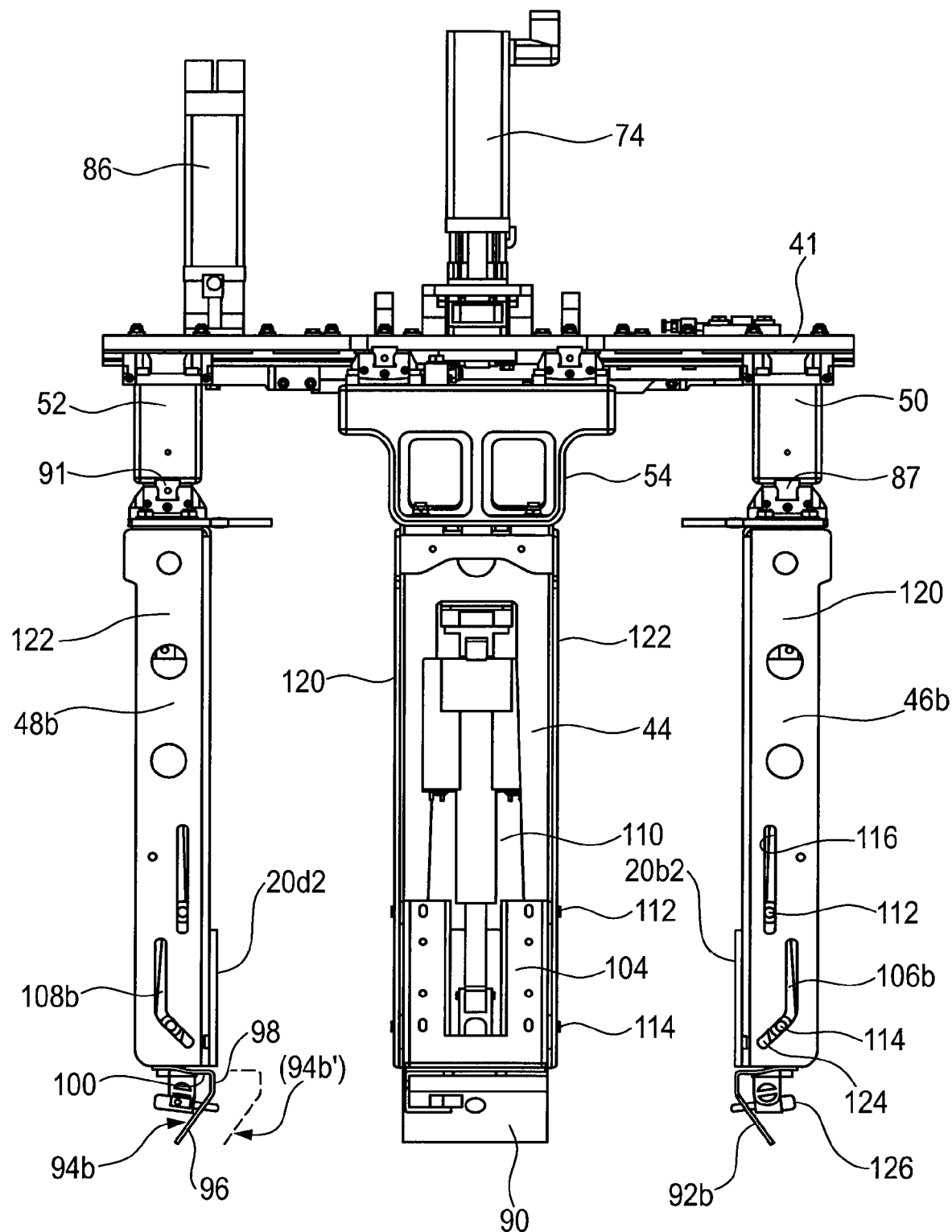
FIG. 7 shows a side view of the grab head depicted in FIG. 4 seen from the right.

As shown especially on the left in FIG. 7, the centering bars are formed as angle profiles and each have a centering leg 96, which is inclined in relation to the vertical in FIG. 7, so that the space enclosed by the centering bars 88, 90, 92, 94 expands downwards. The centering leg 96 is followed upwards by a holding leg 98, which runs in the centering position shown as an extension of the respective grabber plate 20a, 20b, 20c, 20d.

Each centering bar 88, 90, 92, 94 also has a fixing leg 100, which fixes the centering bar to a respective carriage 102, 104, 106a, 106b and 108a, 108b (see FIG. 2). These carriages 102, 104, 106, 108 are each respectively guided vertically within the grabber arm 42, 44, 46a, 46b and 48a, 48b, which is designed as a U-profile. The guide carriages 102, 104, 106a, 106b and 108a, 108b are each adjusted via a linear drive, of which in FIG. 7 only the linear drive assigned to carriage 102 is provided with a reference sign 110. This linear drive, which is configured as a servo drive, is in turn driven via the common control unit 22. As can be seen in FIG. 7 in particular, the carriages are guided by guide pins 112, 114 in motion links 116, 118 in sidewalls 120, 122 of the respective grabber arms 42, 44, 46a, 46b and 48a, 48b, whereby only the sidewalls 120, 122 in FIG. 7 are provided with reference signs.

The motion link 116, in which the upper guide pin 112 is guided, runs parallel to the respective grabber plate 20 in the vertical direction. The motion link 118, at the bottom, in which the second guide pin 114 is guided, has a portion running parallel to the motion link 116 and an angled end portion 124 (see FIG. 7), which extends in the direction of the respective grabber plate 20a, 20b, 20c, 20d.

When the linear drive 110 is inserted, the two guide pins 112, 114 are moved along the motion links 116, 118, in the illustration according to FIG. 7 upwards towards the guide plate 41, so that the respective centering bar 88, 90, 92, 94 is inserted into the U-profile of the grabber arm 42, 44, 46 and 48, respectively, until the guide pins 112, 114 strike the respective end portion of the motion links 116, 118.

When the linear drives 110 are retracted (downwards in FIG. 7), the centering bars 88, 90, 92, 94 are then moved downwards accordingly until they reach the positions shown in FIGS. 4, 6 and 7, in which the holding legs 98 run in extensions of the grabber plates 20a, 20b, 20c, 20d respectively. The guide pin 114 is then already in the angled end portion 124 of the motion links 118. When the linear drive 110 is further retracted, the centering bars are moved inwards and then reach the support position indicated in FIG. 7 as dotted line, in which the centering bars 88, 90, 92a, 92b and 94a, 94b protrude into the space enclosed by the grabber arms 42, 44, 46a, 46b and 48a, 48b, so that the packages are supported from below.

This means that during transport from the infeed conveyor 4 to the loading plate 12, the respective package (tray 36, product 2) is supported both laterally by the grabber plates 20a, 20b, 20c, 20d as well as vertically by the centering bars 88, 90, 92a, 92b and 94a, 94b.

Particularly in the illustration according to FIG. 7, sensors 126 are also visible, which can be used to detect the end of the already formed product stack in order to avoid a collision of the grab head 16, 18 with this product stack. Such sensors 126 are preferably provided in the area of each centering bar 88, 90, 92a, 92b and 94a, 94b.

In the case where a dry goods segment is to be picked, the picking unit 14 can additionally be equipped with a fork head (not shown), which for receiving the dry goods (product 2) on the infeed conveyor 4 moves in underneath the respective product 2, lifts it off the infeed conveyor 4, and then places it directly on the target pallet 8'. In this case, the loading plate 12 is moved to an intermediate position where it does not cover the target pallet 8'.

Such a fork head has a telescopic fork, which is held by a robot or another handling device and can be extended depending on the product dimensions. In principle, it is also possible to arrange two products next to each other on such an extendable fork. With regard to the basic structure of such a fork head, reference is made to the state of the art discussed at the beginning.

The fork head can be equipped with a knife edge, which simplifies the insertion of the fork head under the respective product 2. With regard to the details of such a knife head, which can also be equipped with brushes for frictional engagement, it is referred to the explanations in EP 2 794 439 B1 mentioned at the beginning.

The transport safety device can be carried out by means of a foil ring winder integrated in the picking unit 14, which secures the stacked products 2 by wrapping them from bottom to top in the sequence of the deposited layers. Such foil ring winders are known, so that further explanations are not necessary.

Depending on the type of product 2, the packing pattern generator 32 drives the picking unit 14 in such a way that the products are either placed on the loading plate 12 via the grab heads 16, 18 or are stacked directly onto the target pallet 8 via the fork heads. I.e. both units (grab heads, fork heads) can be brought into operative engagement alternatively or parallel to each other in order to produce the respective product stack. For example, it is possible to stack fruit and vegetable crates as well as dry goods on the target pallet 8.

Of course, the picking unit 14 can also be designed with grab heads or fork heads only—the most flexible solution, however, is to integrate both systems into the picking unit 14.

As mentioned at the beginning, the loading/picking system according to the invention makes it possible to pick a wide variety of products significantly faster than before with a minimum of personnel expenses.

FIG. 3 shows an alternative transport means with which the empty/target pallet 8 can be loaded and discharged if the pallet transport belt 6 is unsuitable for transporting such a special pallet. This may be the case, for example, if the target pallet 8 does not have the dimensions of a Euro pallet or has a smaller format, such as a quarter or half the dimensions of a Euro pallet.

Figure 8:
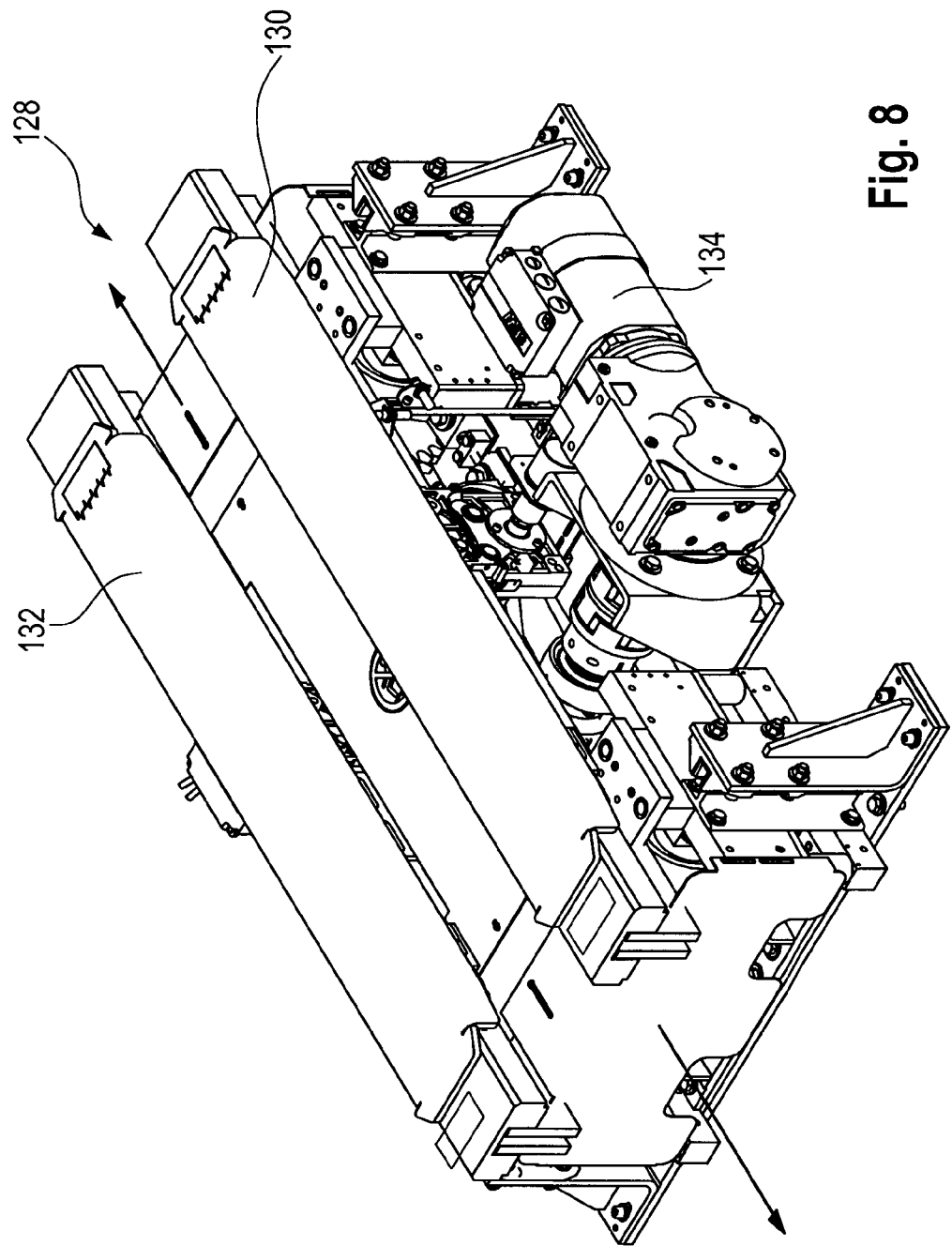
FIG. 8 shows a telescopic fork for alternative loading and discharging of a target pallet.

In this case, a telescopic fork 128 can be used according to FIG. 8, which is mounted on a suitable transport cart (not shown). Such a telescopic fork 128 has two extensible, telescopic forks 130, 132, which can be extended by means of a servo drive 134 in both directions of the arrow (see FIG. 8) in order to position an empty pallet under the loading plate 12 or to discharge the picking pallet. The forks 130, 132 are driven by the control unit 22 or the packing pattern generator 32.

Disclosed are a picking or loading system and a grab head for different products, which are stacked on a loading plate in several product stacks.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A loading system for palletizing mixed products or trays on a target pallet, having at least two infeed conveyors for the products to be palletized, at least one grab head and a control means for controlling said conveyors and said grab head such that the grab head which is configured to take products from one of the infeed conveyors in a predetermined sequence and to stack said products on a loading plate, via which at least one product stack can be transferred to the target pallet, wherein a base surface of the loading plate is larger than the base surface of the target pallet and wherein a plurality of at least two product stacks are arranged on the loading plate during stacking and which are arranged at a distance (a) from one another in a level and further comprising a centering device controlled by the control means to push the product stacks together approximately to the size of the target pallet; and wherein the centering device includes five sliding panels which are slidably guided in the push-together direction and two of which can be slid apart to open a transport path.

2. The loading system according to claim 1, wherein the product stacks are constructed level by level approximately parallel, wherein a level of a product stack includes a plurality of products taken as intermediate stacks by the grab head from the infeed conveyor.

3. The loading system according to claim 2, wherein the loading plate is movable away under the product stacks in the horizontal direction for the transfer to the target pallet, wherein the product stacks are preferably held by the centering device.

4. The loading system according to claim 1, wherein the grab head has at least four grabber plates which are arranged approximately at right angles to one another and which can be brought into lateral contact with the product or a product stack in order to hold it, and comprising a guide for moving the grab head in the X, Y, and/or Z direction.

5. The loading system according to claim 4, wherein at least one grabber plate being assigned a device for supporting and centering the product or the product stack.

6. The loading system according to claim 5, wherein each grabber plate being assigned a centering bar which is adjustably guided on a grabber arm holding the grabber plate, so that the product is supported in one position of the centering bar and the centering takes place in another position.

7. The loading system according to claim 1, further comprising a fork head which is configured to take, in a repeating sequence, at least one product from one of the infeed conveyors and to place it on the target pallet.

8. The loading system according to claim 7, wherein the fork head is configured with a knife edge.

9. The loading system according to claim 1, further comprising a height-adjustable foil ring winder for securing the products.

10. The loading system according to claim 1, further comprising at least four parallel infeed conveyors and a discharge belt are present, wherein two grab heads and/or fork heads are associated with the infeed conveyors.

11. The loading system according to claim 1, further comprising a packing pattern generator for controlling the loading system according to a packing pattern depending on the type of products to be placed on the target pallet.

12. The loading system according to claim 11, with a display for visualizing the packing pattern before or during picking.

13. The loading system according to claim 1, wherein the products or trays are provided with a stacking lug or a centering recess, respectively, which ensure a relative positioning of adjacent products or trays in the product stack during stacking.

* * * * *